United States Patent
Zheng

(10) Patent No.: US 11,350,215 B2
(45) Date of Patent: May 31, 2022

(54) AUDIO PLAY AND ACQUISITION METHOD AND APPARATUS, DEVICE, AND READABLE STORAGE MEDIUM

(71) Applicant: Tencent Technology (Shenzhen) Company Limited, Shenzhen (CN)

(72) Inventor: Xiangwei Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/229,712

(22) Filed: Apr. 13, 2021

(65) Prior Publication Data

US 2021/0235193 A1    Jul. 29, 2021

Related U.S. Application Data

(63) Continuation of application No. PCT/CN2020/072810, filed on Jan. 17, 2020.

(30) Foreign Application Priority Data

Jan. 30, 2019 (CN) .......................... 201910092056.7

(51) Int. Cl.
  *H04R 5/04* (2006.01)
  *G06F 3/16* (2006.01)
  (Continued)

(52) U.S. Cl.
  CPC .............. *H04R 5/04* (2013.01); *A63F 13/215* (2014.09); *A63F 13/25* (2014.09); *G06F 3/165* (2013.01);
  (Continued)

(58) Field of Classification Search
  CPC .......... H04R 5/04; H04R 1/08; H04R 1/1041; H04R 3/00; H04R 5/033; H04R 2420/07;
  (Continued)

(56) References Cited

U.S. PATENT DOCUMENTS

2006/0258406 A1   11/2006 Igarashi et al.
2010/0004926 A1   1/2010 Neoran et al.
(Continued)

FOREIGN PATENT DOCUMENTS

CN    101536473 A    9/2009
CN    106412259 A    2/2017
(Continued)

OTHER PUBLICATIONS

Tencent Technology, WO, PCT/CN2020/072810, Apr. 9, 2020, 4 pgs.

(Continued)

*Primary Examiner* — Paul Kim
(74) *Attorney, Agent, or Firm* — Morgan, Lewis & Bockius LLP

(57) ABSTRACT

This application discloses an audio play and acquisition method. The method is applicable to a terminal connected to a Bluetooth headset. The terminal is configured with a terminal microphone, and the Bluetooth headset is configured with a headset microphone. The terminal displays a program interface for playing first audio through the Bluetooth headset in a form of a stereo sound effect. After receiving a voice input signal, the terminal invokes the terminal microphone to activate a voice input channel to acquire second audio as voice input content. When the first audio is played through the Bluetooth headset in a form of the stereo sound effect, the second audio is acquired as the voice input content through the terminal microphone. The (Continued)

second audio is acquired through the terminal microphone while ensuring the first audio is played with a stereo sound effect by the Bluetooth headset.

20 Claims, 8 Drawing Sheets

(51) Int. Cl.
*A63F 13/215* (2014.01)
*A63F 13/25* (2014.01)
*H04R 1/08* (2006.01)
*H04R 1/10* (2006.01)
*H04R 3/00* (2006.01)
*H04R 5/033* (2006.01)

(52) U.S. Cl.
CPC ............... *G06F 3/167* (2013.01); *H04R 1/08* (2013.01); *H04R 1/1041* (2013.01); *H04R 3/00* (2013.01); *H04R 5/033* (2013.01); *A63F 2300/1081* (2013.01); *A63F 2300/6063* (2013.01); *H04R 2420/07* (2013.01); *H04R 2430/01* (2013.01)

(58) Field of Classification Search
CPC .... H04R 2430/01; A63F 13/215; A63F 13/25; A63F 2300/1081; A63F 2300/6063; G06F 3/165; G06F 3/167

USPC ........................................................ 381/311
See application file for complete search history.

(56) References Cited

U.S. PATENT DOCUMENTS

2010/0150383 A1* 6/2010 Sampat .................... H04R 1/10
381/311
2018/0324486 A1 11/2018 Lee et al.

FOREIGN PATENT DOCUMENTS

| CN | 105050034 B | 4/2017 |
| CN | 108924361 A | 11/2018 |
| CN | 110166890 A | 8/2019 |
| EP | 2632228 A1 | 8/2013 |
| KR | 20080066136 A | 7/2008 |

OTHER PUBLICATIONS

Tencent Technology, IPRP, PCT/CN2020/072810, Jul. 27, 2021, 5 pgs.
Tencent Technology, ISR, PCT/CN2020/072810, Apr. 9, 2020, 2 pgs.
Extended European Search Report, EP20749204.2, dated Feb. 16, 2022, 9 pgs.

* cited by examiner

AUDIO PLAY AND ACQUISITION METHOD AND APPARATUS, DEVICE, AND READABLE STORAGE MEDIUM

CROSS-REFERENCE TO RELATED APPLICATIONS

This application is a continuation application of PCT Patent Application No. PCT/CN2020/072810, entitled "AUDIO PLAY AND ACQUISITION METHOD, DEVICE, AND STORAGE MEDIUM" filed on Jan. 17, 2020, which claims priority to Chinese Patent Application No. 201910092056.7, entitled "AUDIO PLAY AND ACQUISITION METHOD, DEVICE, AND STORAGE MEDIUM" and filed on Jan. 30, 2019, both of which are incorporated herein by reference in their entirety.

FIELD OF THE TECHNOLOGY

Embodiments of this application relate to the field of audio processing, and in particular, to an audio play and acquisition method and apparatus, a device, and a readable storage medium.

BACKGROUND OF THE DISCLOSURE

A Bluetooth headset is a headset device that plays current to-be-played audio in a terminal after being connected to the terminal through Bluetooth. Generally, the Bluetooth headset is equipped with a microphone for receiving sound and a sound-emitting unit for sounding, and users may wear the Bluetooth headset to listen to music being played in a music application program installed on the terminal, or a game background sound being played in a game application program.

In the related art, the Bluetooth headset is connected to the terminal through a Synchronous Connection Oriented VoIP (SCO VoIP) connection mode. In the connection mode, the Bluetooth headset may sound through the sound-emitting unit and receive sound through the microphone, and the sound through the sound-emitting unit is a sound with a mono sound effect.

However, in the game application program, it is usually necessary to play the game background sound through a stereo sound effect. The game background sound through the stereo sound effect is used for identifying orientations such as an orientation of a shot sound and an orientation of a footstep sound. Through the foregoing connection mode, the Bluetooth headset cannot play the game background sound with the stereo sound effect while acquiring audio, and functions of the game application program cannot be achieved normally.

SUMMARY

Embodiments of this application provide an audio play and acquisition method and apparatus, a device, and a readable storage medium, thereby implementing audio acquisition while playing stereo sound. The technical solutions are as follows:

According to an aspect, an audio play and acquisition method is provided, applicable to a terminal connected to a Bluetooth headset, the terminal being configured with a terminal microphone, and the Bluetooth headset being configured with a headset microphone, the method including:

displaying a program interface of a target application program, the program interface being corresponding to first audio, and the first audio being played through the Bluetooth headset in a form of a stereo sound effect;

receiving a voice input signal, the voice input signal being used for enabling a voice input function of the terminal, and the voice input function being used for acquiring voice input content;

blocking, according to the voice input signal, a channel activating notification to be transmitted to the headset microphone, the channel activating notification being used for notifying the headset microphone to activate a first voice input channel; and invoking the terminal microphone to activate a second voice input channel to acquire second audio as the voice input content.

According to another aspect, an audio play and acquisition apparatus is provided, applicable to a terminal connected to a Bluetooth headset, the terminal being configured with a terminal microphone, and the Bluetooth headset being configured with a headset microphone, the apparatus including:

a display module, configured to display a program interface of a target application program, the program interface being corresponding to first audio, and the first audio being played through the Bluetooth headset in a form of a stereo sound effect;

a receiving module, configured to receive a voice input signal, the voice input signal being used for enabling a voice input function of the terminal, and the voice input function being used for acquiring voice input content; and a transmitting module, configured to block, according to the voice input signal, a channel activating notification to be transmitted to the headset microphone, the channel activating notification being used for notifying the headset microphone to activate a first voice input channel; and invoke the terminal microphone to activate a second voice input channel to acquire second audio as the voice input content.

According to another aspect, a terminal is provided, the terminal being connected to a Bluetooth headset and including a processor, a terminal microphone and a memory, the memory storing a plurality of instructions that, when executed by the processor, cause the terminal to implement the audio play and acquisition method provided by the foregoing embodiments of this application.

According to another aspect, a non-transitory computer-readable storage medium is provided, storing a plurality of instructions that, when executed by a processor of a terminal connected to a Bluetooth headset and having its own terminal microphone, cause the terminal to implement the audio play and acquisition method provided by the foregoing embodiments of this application.

According to another aspect, a computer program product is provided, the computer program product, when run on a computer, causing the computer to perform the audio play and acquisition method provided by the foregoing embodiments of this application.

Beneficial effects brought by the technical solutions provided in the embodiments of this application are at least as follows:

When the terminal is connected to the Bluetooth headset and plays the first audio in a form of the stereo sound effect through the Bluetooth headset, the second audio is acquired as the voice input content through the terminal microphone. The second audio is acquired through the terminal microphone while ensuring the first audio is played with a stereo sound effect by the Bluetooth headset, thereby avoiding the problem that the audio cannot be acquired while the stereo sound is played by using the Bluetooth headset. By applying the technical solutions in a game application program, the functions of the game application program can be achieved normally.

BRIEF DESCRIPTION OF THE DRAWINGS

To describe the technical solutions in embodiments of this application more clearly, the following briefly describes the accompanying drawings required for describing the embodiments. Apparently, the accompanying drawings in the following descriptions show only some embodiments of this application, and a person of ordinary skill in the art may still derive other accompanying drawings from the accompanying drawings without creative efforts.

DESCRIPTION OF EMBODIMENTS

To make the objectives, technical solutions, and advantages of this application clearer, implementations of this application are further described below in detail with reference to the accompanying drawings.

Figure 1:
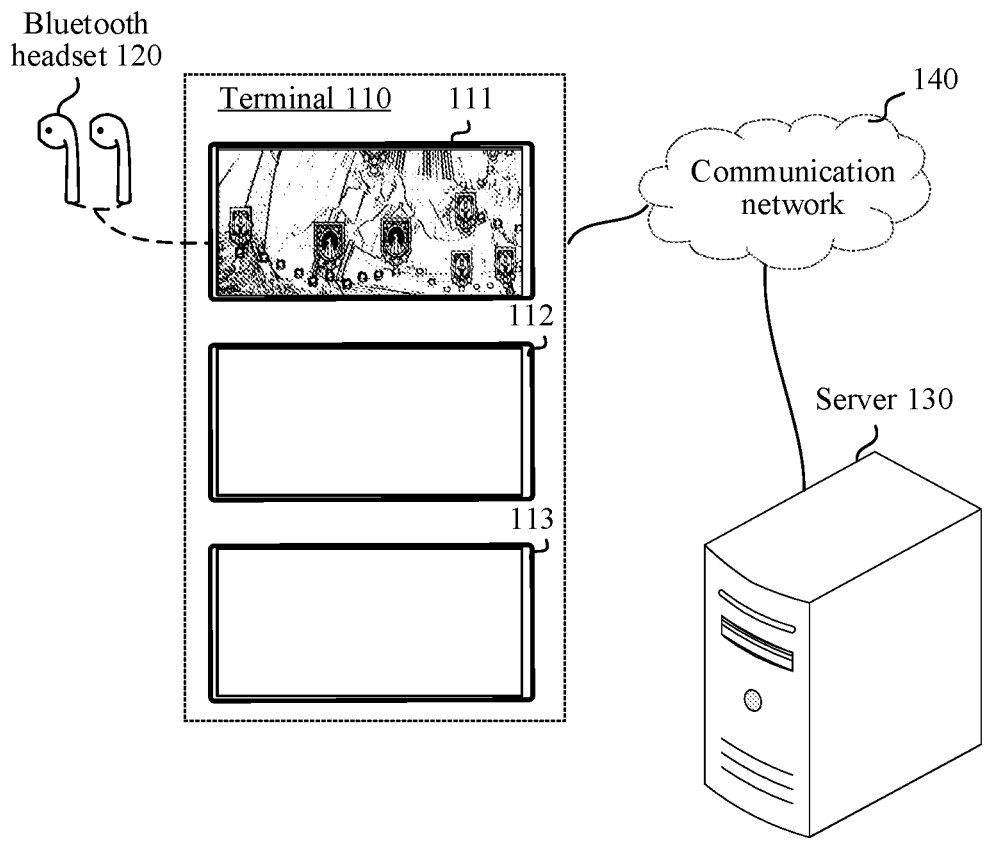
FIG. 1 is a schematic diagram of an implementation environment according to an exemplary embodiment of this application.

First, an implementation environment in embodiments of this application is briefly described. As shown in FIG. 1, the implementation environment includes a terminal 110, a Bluetooth headset 120, and a server 130, and the Bluetooth headset 120 is connected to the terminal 110 through Bluetooth.

In some embodiments, data transmission may be performed between the Bluetooth headset 120 and the terminal 110 through various Bluetooth transmission protocols. Exemplarily, the data transmission may be performed between the Bluetooth headset 120 and the terminal 110 through an Advanced Audio Distribution Profile (A2DP) protocol, or the data transmission may be performed through a Synchronous Connection Oriented VoIP (SCO VoIP) protocol. Moreover, the Bluetooth transmission protocol between the Bluetooth headset 120 and the terminal 110 may be switched between the foregoing two protocols, but there can be only one Bluetooth transmission protocol between the Bluetooth headset 120 and the terminal 110 at a same time. Exemplarily, the Bluetooth headset 120 supports both the A2DP protocol and the SCO VoIP protocol. At moment t1, the terminal 110 first selects the A2DP protocol as the Bluetooth transmission protocol between the terminal 110 and the Bluetooth headset 120, and performs data transmission with the Bluetooth headset 120 through the A2DP protocol. At any moment t2 after the moment t1, after setting the SCO VoIP protocol as the Bluetooth transmission protocol between the terminal 110 and the Bluetooth headset 120, the terminal 110 performs data transmission with the Bluetooth headset 120 through the SCO VoIP protocol.

In some embodiments, the Bluetooth headset 120 is configured with a headset microphone, and the terminal 110 is configured with a terminal microphone.

In some embodiments, the terminal 110 is configured to determine audio that needs to be played and transmit the audio that needs to be played to the foregoing Bluetooth headset 120 for playing, for example, playing music in a music application program through the Bluetooth headset 120 or playing a game background sound in a game application program through the Bluetooth headset 120. In some embodiments, the terminal 110 may be further implemented as a plurality of terminals. As shown in FIG. 1, the terminal 110 includes a terminal 111, a terminal 112, and a terminal 113.

In some embodiments, the terminal 110 is connected to the server 130 by using a communication network 140. The communication network 140 may be a wired network or may be a wireless network.

Exemplarily, an example in which a game application program is installed in the terminal 110 is used for description. A first account is logged in to the game application program. The server 130 is configured to receive voice input content transmitted by the terminal, and transmit the voice input content to the terminal 110 corresponding to a teammate account of the first account and/or transmit the voice input content to the terminal 110 corresponding to an opponent account of the first account according to settings of the game application program. Exemplarily, as shown in FIG. 1, the first account is logged in to the terminal 111, and a second account is logged in to the terminal 112. The first account and the second account are in a teammate relationship in a game battle. A voice mode enabled by the first account is the voice mode between teammates. The terminal 111 transmits voice input content of the first account to the server 130 through the communication network 140, and the server 130 transmits the voice input content to the terminal 112 through the communication network 140 as voice communication content between teammates.

The foregoing two protocols are briefly described as follows:

The A2DP protocol is a protocol that supports the transmission of stereo sound but does not support audio acquisition of the Bluetooth headset 120, that is, when data transmission is performed between the terminal 110 and the Bluetooth headset 120 through the A2DP protocol, the Bluetooth headset 120 may receive stereo sound transmitted by the terminal 110 and receive mono audio transmitted by the terminal 110, but the Bluetooth headset 120 cannot transmit the obtained audio acquired by the microphone to the terminal 110 for transmission.

Figure 2:
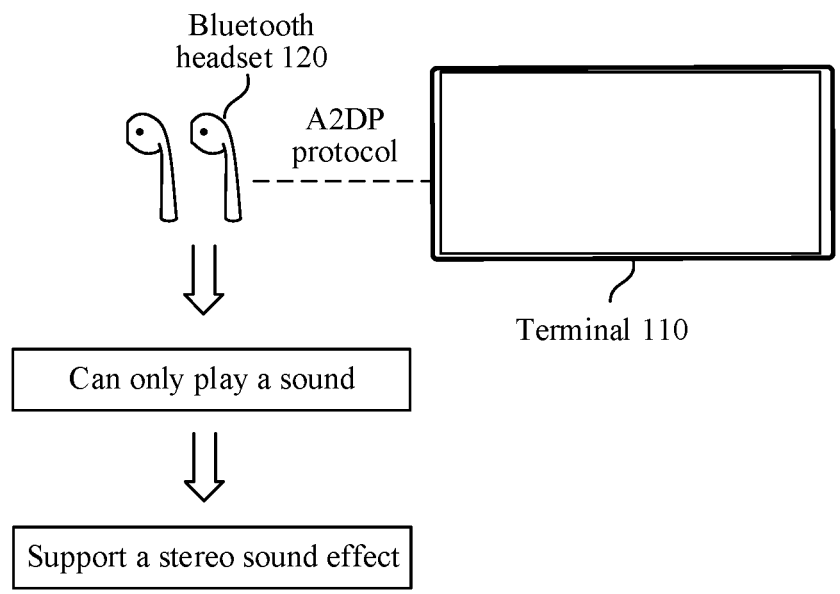
FIG. 2 is a schematic functional diagram of a Bluetooth headset when data is transmitted between the Bluetooth headset and a terminal through an A2DP protocol according to an exemplary embodiment of this application.

That is, as shown in FIG. 2, when data transmission is performed between the terminal 110 and the Bluetooth headset 120 through the A2DP protocol, the Bluetooth headset 120 can only play a sound, and can play the sound in a form of a stereo sound effect, but the Bluetooth headset 120 cannot acquire audio. When the audio with the stereo sound effect being played in the terminal is a background sound in the game application program, the account logged in to the game application program cannot communicate in voice with teammates or opponents.

The SCO VoIP protocol is a protocol that supports both audio transmission and audio acquisition, but does not support stereo sound transmission, that is, when data transmission is performed between the terminal 110 and the Bluetooth headset 120 through the SCO VoIP protocol, the Bluetooth headset 120 may receive mono audio transmitted by the terminal 110 and acquire audio and transmit the audio to the terminal 110, but the Bluetooth headset 120 cannot receive stereo sound transmitted by the terminal 110.

Figure 3:
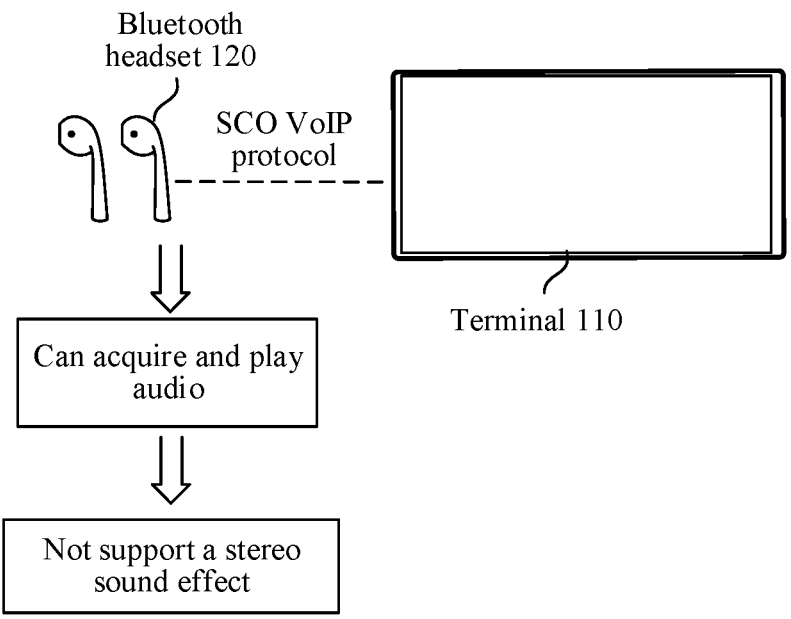
FIG. 3 is a schematic functional diagram of a Bluetooth headset when data is transmitted between the Bluetooth headset and a terminal through an SCO VoIP protocol according to an exemplary embodiment of this application.

That is, as shown in FIG. 3, when data transmission is performed between the terminal 110 and the Bluetooth headset 120 through the SCO VoIP protocol, the Bluetooth headset 120 may acquire audio and play audio, but the audio played by the Bluetooth headset 120 cannot be implemented in a form of the stereo sound effect. When the application program being run on the terminal is a game application program and the audio played by the Bluetooth headset 120 is a game background sound, an orientation of the background sound such as an orientation of a shot sound or an orientation of a footstep sound cannot be determined according to the game background sound.

Figure 4:
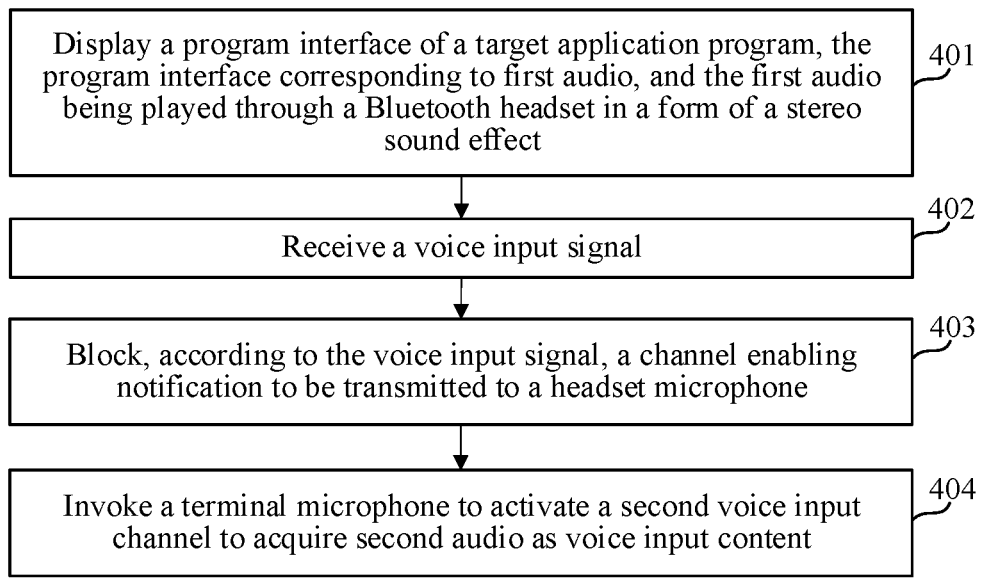
FIG. 4 is a flowchart of an audio play and acquisition method according to an exemplary embodiment of this application.

FIG. 4 is a flowchart of an audio play and acquisition method according to an exemplary embodiment of this application. An example in which the method is applied to the terminal 110 shown in FIG. 1 is used for description. The terminal is connected to a Bluetooth headset and configured with a terminal microphone, and the Bluetooth headset is configured with a headset microphone. As shown in FIG. 4, the method includes the following steps:

Step 401. Display a program interface of a target application program, the program interface being corresponding to first audio, and the first audio being played through the Bluetooth headset in a form of a stereo sound effect.

In some embodiments, the target application program includes any one of a game application program, a music application program, a video application program, a social application program, and a financial application program.

In some embodiments, when the target application program is the game application program, the program interface is a game interface in the game application program, and the program interface includes a picture of observing a virtual environment by a virtual object. The first audio corresponding to the game interface is background audio in a game process. When the first audio is audio with the stereo sound effect, the first audio is used for identifying an orientation of a sound-emitting position relative to the virtual object in the virtual environment. Exemplarily, the background audio includes at least one of a footstep sound, a shot sound, magic dubbing audio, special effect dubbing audio, and vehicle starting sound. When the foregoing background audio is played through the Bluetooth headset in a form of the stereo sound effect, an orientation of the background audio such as an orientation of a shot sound or an orientation of a footstep sound may be identified. Exemplarily, the program interface includes the picture of observing the virtual environment by the virtual object. When the shot sound is from the left side of the virtual object in a virtual battle, the shot sound played by the Bluetooth headset corresponding to the left ear is louder to reflect that the orientation of the shot sound is from the left side of the virtual object in the virtual environment.

In some embodiments, when the target application program is the music application program, the program interface is a play interface in the music application program, the first audio is music currently played in the music application program, and the music is played through the Bluetooth headset in a form of the stereo sound effect.

In some embodiments, when the target application program is the video application program, the program interface is a video play interface in the video application program, the first audio is dubbing audio of a video currently played in the video application program, and the dubbing audio is played through the Bluetooth headset in a form of the stereo sound effect.

In some embodiments, when the target application program is the social application program, the program interface may be a public social interface in the social application program, or may be a chat interface in the social application program. The first audio is audio played in the social application program, for example, the first audio may be audio published in the public social interface, or may be audio transmitted by a chat object in the chat interface, or may be a program background sound of the social application program.

In some embodiments, when the target application program is the financial application program, the program interface may be at least one of a transfer interface, a balance check interface, and a bill query interface in the financial application program, and the first audio may be a program background sound in the financial application program, or may be special effect dubbing audio in the financial application program, such as a sound of gold coin falling.

In some embodiments, a stereo connection mode between the Bluetooth headset and the terminal corresponding to the program interface is a default connection mode, or a currently set connection mode between the Bluetooth headset and the terminal corresponding to the program interface is the stereo connection mode. In some embodiments, the stereo connection mode is a connection mode for data transmission between the terminal and the Bluetooth headset through the A2DP protocol. That is, when the terminal displays the program interface, the data transmission is performed between the Bluetooth headset and the terminal through the A2DP protocol by default. Alternatively, after the terminal receives a mode selection operation, the A2DP protocol is used as the protocol for data transmission between the Bluetooth headset and the terminal.

Step 402. Receive a voice input signal.

In some embodiments, the voice input signal is used for enabling a voice input function of the terminal, and the voice input function is used for acquiring voice input content.

In some embodiments, the voice input signal may be generated according to an operation of a user in the terminal, or may be transmitted to the terminal by a server. Exemplarily, the terminal displays a game battle interface. When the user enables a voice function in the game battle interface, the terminal receives the voice input signal. Alternatively, when the terminal enters a game battle, the server transmits the voice input signal to the terminal to enable a voice function of the game battle.

In some embodiments, the voice input function may be a function provided in the program interface, or may be a function provided by other interfaces in the target application program, or may be a function provided by another application program or a function provided by a terminal operating system.

Exemplarily, an example in which the program interface is the game interface in the game application program of the terminal is used. The voice input function is a voice dialog function provided by the game interface. An account logged in to the game application program can perform voice dialog communication with teammates and/or opponents through the voice dialog function. In some embodiments, the voice input function is a voice translation function provided in a translation application program, and voice input content is translated through the voice translation function.

Step 403. Block, according to the voice input signal, a channel activating notification to be transmitted to the headset microphone.

In some embodiments, the channel activating notification is used for notifying the headset microphone to activate a first voice input channel, and second audio is acquired through the first voice input channel. The channel activating notification to be transmitted to the headset microphone is blocked, so that the headset microphone does not receive the channel activating notification or activate the first voice input channel to acquire the second audio.

Step 404. Invoke the terminal microphone to activate a second voice input channel to acquire the second audio as the voice input content.

In some embodiments, the terminal microphone is a microphone configured on the terminal. In some embodiments, the second audio is audio acquired by the terminal microphone. In some embodiments, the voice input content is content applied to the voice input function.

In some embodiments, the play of the first audio and the acquisition of the second audio are performed simultaneously.

In some embodiments, because the Bluetooth headset is configured with the headset microphone, by default, the second audio is acquired as the voice input content through the first voice input channel enabled by the headset microphone. However, when the first audio is played through the Bluetooth headset, and the second audio is acquired through the Bluetooth headset at the same time, the first audio cannot be played in a form of the stereo sound effect. Therefore, the channel activating notification to be transmitted to the headset microphone is blocked.

In some embodiments, a method for determining to activate the second voice input channel through the terminal microphone includes any one of the following methods:

first, receiving the mode selection operation, and in response to the selected connection mode corresponding to the mode selection operation being the stereo connection mode, activating the second voice input channel through the terminal microphone to acquire the second audio as the voice input content;

second, determining a play sound effect of the first audio played by the Bluetooth headset, in response to the play sound effect of the first audio being the stereo sound effect, blocking, according to the voice input signal, the channel activating notification to be transmitted to the headset microphone, and notifying the terminal microphone to activate the second voice input channel to acquire the second audio as the voice input content; or third, when the connection mode between the terminal and the Bluetooth headset is the stereo connection mode by default, activating the second voice input channel through the terminal microphone to acquire the second audio as the voice input content.

Figure 5:
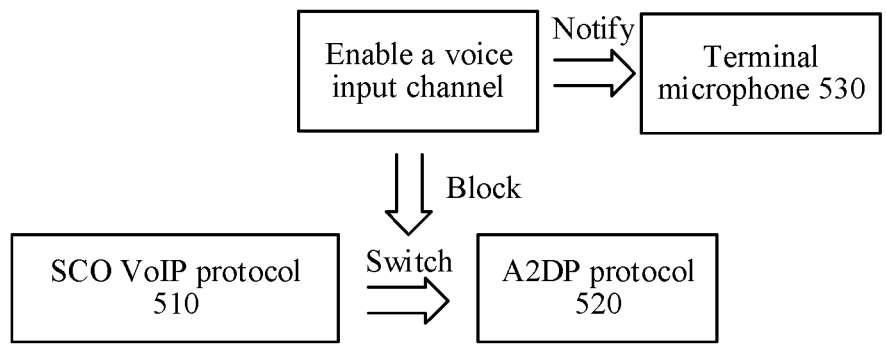
FIG. 5 is a schematic diagram of a process of activating a voice input channel when data is transmitted between a Bluetooth headset and a terminal through an A2DP protocol according to an exemplary embodiment of this application.
Figure 6:
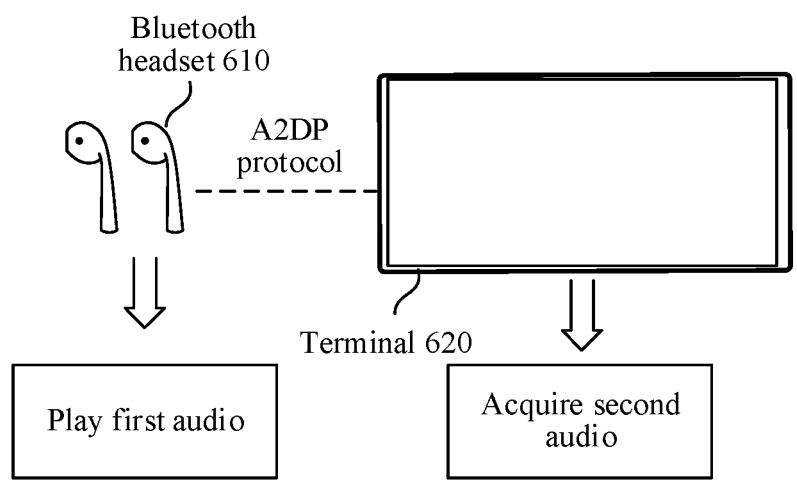
FIG. 6 is a schematic functional diagram of a Bluetooth headset and a terminal when data is transmitted between the Bluetooth headset and the terminal through an A2DP protocol according to an exemplary embodiment of this application.

Exemplarily, an example in which the A2DP protocol is used as the protocol for data transmission between the Bluetooth headset and the terminal after the terminal receives the mode selection operation is used for description. Referring to FIG. 5, data transmission is performed between the terminal and the Bluetooth headset through an SCO VoIP protocol 510. After the terminal receives the mode selection operation, data transmission is performed between the terminal and the Bluetooth headset through an A2DP protocol 520, the notification of activating a voice input channel to the Bluetooth headset is blocked, and a terminal microphone 530 is invoked to activate the voice input channel. That is, as shown in FIG. 6, a Bluetooth headset 610 is only responsible for playing the first audio, and a terminal 620 is responsible for acquiring the second audio through a microphone.

In summary, by using the audio play and acquisition method provided in this embodiment, when the terminal is connected to the Bluetooth headset and plays the first audio in a form of the stereo sound effect through the Bluetooth headset, the second audio is acquired as the voice input content through the terminal microphone. The second audio is acquired through the terminal microphone while ensuring the first audio is played with a stereo sound effect by the Bluetooth headset, thereby avoiding the problem that the audio cannot be acquired while the stereo sound is played by using the Bluetooth headset. By applying the technical solutions in a game application program, the functions of the game application program can be achieved normally.

Figure 7:
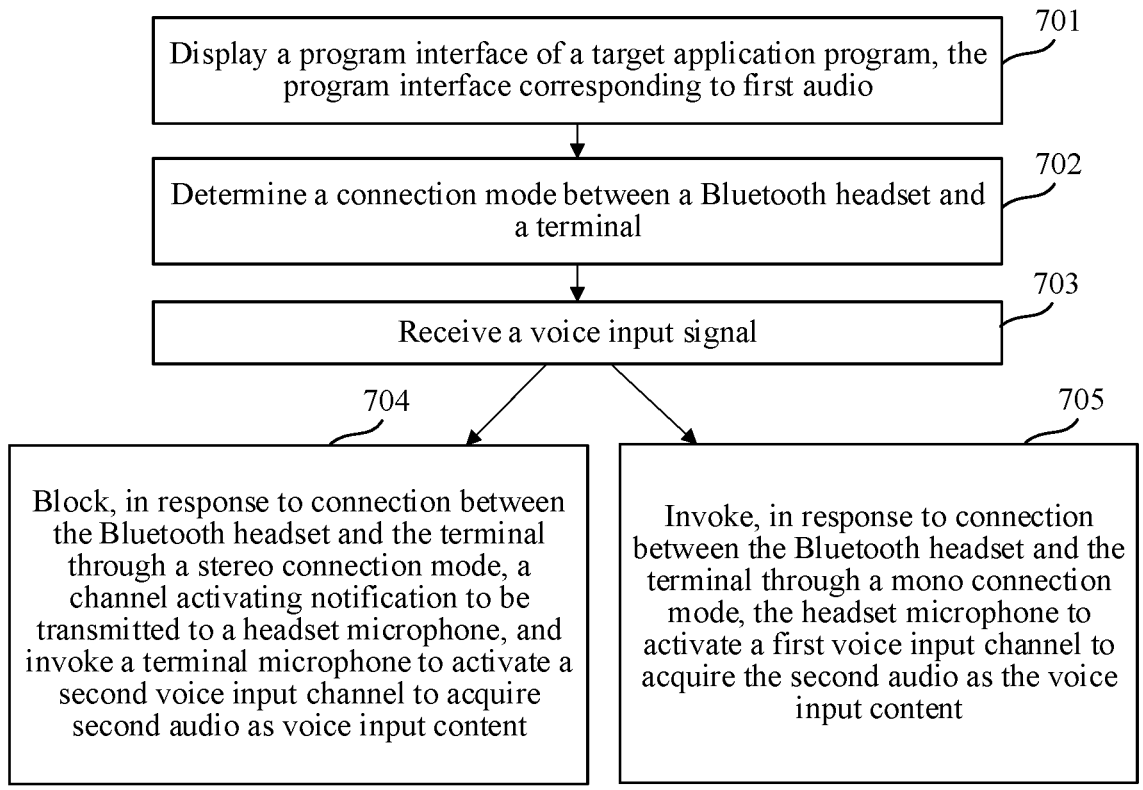
FIG. 7 is a flowchart of an audio play and acquisition method according to another exemplary embodiment of this application.

In some embodiments, data transmission may be further performed between the Bluetooth headset and the terminal through the SCO VoIP protocol. FIG. 7 is a flowchart of an audio play and acquisition method according to another exemplary embodiment of this application, and an example in which the method is applied to the terminal 110 shown in FIG. 1 is used for description. As shown in FIG. 7, the method includes the following steps:

Step 701. Display a program interface of a target application program, the program interface being corresponding to first audio.

In some embodiments, the first audio is played through a Bluetooth headset in a form of a stereo sound effect, or the first audio is played through the Bluetooth headset in a form of a mono sound effect. A play form of the first audio is determined according to a connection mode between the Bluetooth headset and the terminal.

In some embodiments, the target application program includes any one of a game application program, a music application program, a video application program, a social application program, and a financial application program.

In some embodiments, in this embodiment, an example in which the target application program is the game application program is used for description. The program interface is a game interface in the game application program, and the program interface includes a picture of observing a virtual environment by a virtual object. The first audio corresponding to the game interface is background audio in a game process. When the first audio is audio with the stereo sound effect, the first audio is used for identifying an orientation of a sound-emitting position of the first audio relative to the virtual object in the virtual environment according to the stereo sound effect. Exemplarily, the background audio includes at least one of a footstep sound, a shot sound, magic dubbing audio, special effect dubbing audio, and vehicle starting sound. When the foregoing background audio is played through the Bluetooth headset in a form of the stereo sound effect, an orientation of the background audio such as an orientation of a shot sound or an orientation of a footstep sound may be identified.

Step 702. Determine a connection mode between the Bluetooth headset and the terminal.

In some embodiments, the connection mode includes any one of a stereo connection mode and a mono connection mode. In some embodiments, when the connection mode between the Bluetooth headset and the terminal is the stereo connection mode, the first audio corresponding to the program interface is played through the Bluetooth headset in a form of the stereo sound effect; and when the connection mode between the Bluetooth headset and the terminal is the mono connection mode, the first audio corresponding to the program interface is played through the Bluetooth headset in a form of the mono sound effect.

In some embodiments, the connection mode between the Bluetooth headset and the terminal is obtained according to a mode selection operation. In some embodiments, the terminal receives the mode selection operation, and the mode selection operation is used for selecting the connection mode between the Bluetooth headset and the terminal between the mono connection mode and the stereo connection mode.

Figure 8:
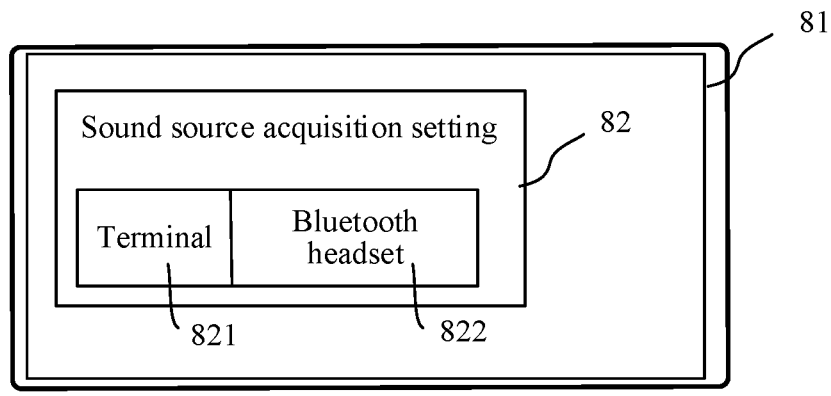
FIG. 8 is a schematic diagram of an interface of a sound source acquisition setting according to an exemplary embodiment of this application.

In some embodiments, the mode selection operation may be an operation of selecting a device that acquires second audio. Exemplarily, an example in which the foregoing target application program is a game application program, and a voice input function is a function provided in the program interface is used for description. As shown in FIG. 8, an audio setting interface 81 of the game application program displays an acquisition source setting item 82, and the acquisition source setting item 82 displays an option terminal 821 and an option Bluetooth headset 822. When a selection operation on the option terminal 821 is received, that is, the second audio is acquired through the terminal microphone, and the Bluetooth headset is only responsible for playing the first audio, data transmission is performed between the Bluetooth headset and the terminal through the A2DP protocol. When a selection operation on the option Bluetooth headset 822 is received, that is, the second audio is acquired through a microphone provided in the Bluetooth headset, the Bluetooth headset is responsible for playing the first audio and acquiring the second audio, and the first audio played by the Bluetooth headset is mono audio, data transmission is performed between the Bluetooth headset and the terminal through an SCO VoIP protocol.

Step 703. Receive a voice input signal.

In some embodiments, the voice input signal is used for enabling a voice input function of the terminal, and the voice input function is used for acquiring voice input content.

In some embodiments, the voice input function may be a function provided in the program interface, or may be a function provided by other interfaces in the target application program, or may be a function provided by another application program or a function provided by a terminal operating system.

Step 704. Block, in response to connection between the Bluetooth headset and the terminal through the stereo connection mode, a channel activating notification to be transmitted to the headset microphone, and notify the terminal microphone to activate a second voice input channel to acquire the second audio as the voice input content.

In some embodiments, because sound intensity of the second audio acquired by the terminal microphone is relatively weak when the second audio is acquired through the terminal microphone, the sound intensity of the acquired second audio is amplified by a preset multiple according to the mode selection operation in response to the selected connection mode corresponding to the foregoing mode selection operation being the stereo connection mode.

In some embodiments, the play of the first audio and the acquisition of the second audio are performed simultaneously.

Step 705. Notify, in response to connection between the Bluetooth headset and the terminal through the mono connection mode, the headset microphone to activate a first voice input channel to acquire the second audio as the voice input content.

In some embodiments, when the Bluetooth headset and the terminal are connected through the mono connection mode, the first audio is played through the Bluetooth headset in a form of the mono sound effect.

Figure 9:
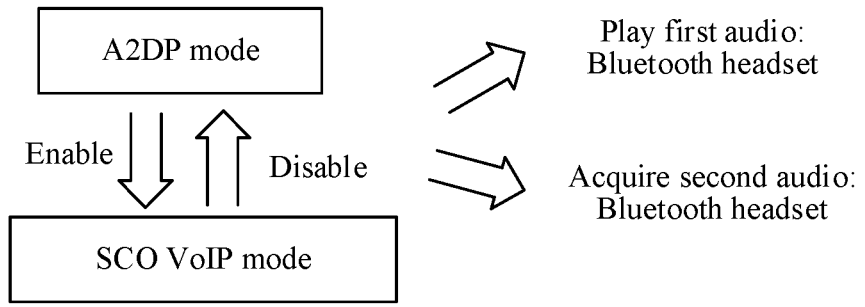
FIG. 9 is a schematic functional diagram of a Bluetooth headset when data is transmitted between the Bluetooth headset and a terminal through an SCO VoIP protocol according to an exemplary embodiment of this application.

Exemplarily, referring to FIG. 9, when the Bluetooth headset and the terminal are connected through the mono connection mode, an SCO VoIP mode is enabled and an A2DP mode is disabled, the first audio is played through the Bluetooth headset, and the second audio is also acquired through the Bluetooth headset.

In summary, by using the audio play and acquisition method provided in this embodiment, when the terminal is connected to the Bluetooth headset and plays the first audio in a form of the stereo sound effect through the Bluetooth headset, the second audio is acquired as the voice input content through the terminal microphone. The second audio is acquired through the terminal microphone while ensuring the first audio is played with a stereo sound effect by the Bluetooth headset, thereby avoiding the problem that the audio cannot be acquired while the stereo sound is played by using the Bluetooth headset. By applying the technical solutions in a game application program, the functions of the game application program can be achieved normally.

In the method provided in this embodiment, the connection mode between the Bluetooth headset and the terminal is selected through the mode selection operation, and according to the selected connection mode, the device that acquires the second audio and the play form of the first audio played by the Bluetooth headset are determined to provide options to adapt to different user habits.

Figure 10:
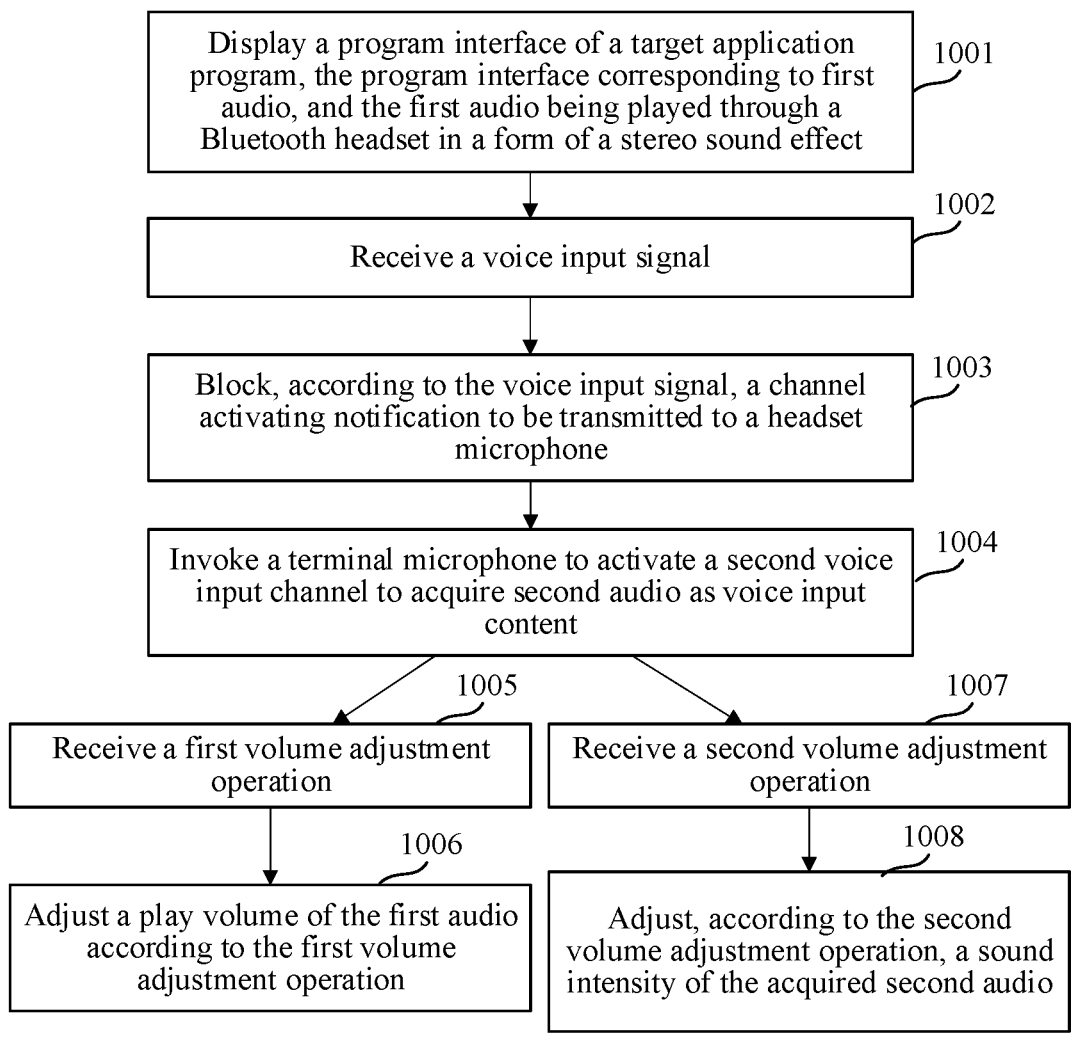
FIG. 10 is a flowchart of an audio play and acquisition method according to another exemplary embodiment of this application.

In some embodiments, volumes of the foregoing first audio and second audio may be adjusted in different adjustment manners respectively. FIG. 10 is a flowchart of an audio play and acquisition method according to another exemplary embodiment of this application, and an example in which the method is applied to the terminal 110 shown in FIG. 1 is used for description. As shown in FIG. 10, the method includes the following steps:

Step 1001. Display a program interface of a target application program, the program interface being corresponding to first audio, and the first audio being played through the Bluetooth headset in a form of a stereo sound effect.

In some embodiments, the target application program is any one of a game application program, a music application program, a video application program, a social application program, and a financial application program.

In some embodiments, a stereo connection mode between the Bluetooth headset and the terminal corresponding to the program interface is a default connection mode, or a currently set connection mode between the Bluetooth headset and the terminal corresponding to the program interface is the stereo connection mode. In some embodiments, the stereo connection mode is a connection mode for data transmission between the terminal and the Bluetooth headset through an A2DP protocol. That is, when the terminal displays the program interface, the data transmission is performed between the Bluetooth headset and the terminal through the A2DP protocol by default. Alternatively, after the terminal receives a mode selection operation, the A2DP protocol is used as the protocol for data transmission between the Bluetooth headset and the terminal.

Step 1002. Receive a voice input signal.

In some embodiments, the voice input signal is used for enabling a voice input function of the terminal, and the voice input function is a function implemented through the acquisition of voice input content.

Step 1003. Block, according to the voice input signal, a channel activating notification to be transmitted to a headset microphone.

In some embodiments, the channel activating notification is used for notifying the headset microphone to activate a first voice input channel, and second audio is acquired through the first voice input channel. The channel activating notification to be transmitted to the headset microphone is blocked, so that the headset microphone does not receive the channel activating notification or activate the first voice input channel to acquire the second audio.

Step 1004. Notify the terminal microphone to activate a second voice input channel to acquire the second audio as the voice input content.

In some embodiments, the headset microphone is a microphone configured on the Bluetooth headset, and the terminal microphone is a microphone configured on the terminal. In some embodiments, the second audio is audio acquired by the terminal microphone. In some embodiments, the voice input content is content applied to the voice input function.

Step 1005. Receive a first volume adjustment operation.

In some embodiments, the first volume adjustment operation includes any one of the following operations.

First, a volume adjustment button is long pressed. In some embodiments, the volume adjustment button is a physical button on the terminal.

Second, the volume adjustment button is continuously pressed for a plurality of times.

Third, the terminal interface includes a volume adjustment control, and an adjustment operation on the volume adjustment control is used as the first volume adjustment operation.

Step 1006. Adjust a play volume of the first audio according to the first volume adjustment operation.

Step 1007. Receive a second volume adjustment operation.

In some embodiments, the second volume adjustment operation includes any one of the following operations.

First, a volume adjustment button is long pressed. In some embodiments, the volume adjustment button is a physical button on the terminal.

Second, the volume adjustment button is continuously pressed for a plurality of times.

Third, the terminal interface includes a volume adjustment control, and an adjustment operation on the volume adjustment control is used as the second volume adjustment operation.

In some embodiments, the foregoing first volume adjustment operation and second volume adjustment operation are two different operations, and adjusted objects are distinguished through the two different operations.

Step 1008. Adjust, according to the second volume adjustment operation, sound intensity of the acquired second audio.

In summary, by using the audio play and acquisition method provided in this embodiment, when the terminal is connected to the Bluetooth headset and plays the first audio in a form of the stereo sound effect through the Bluetooth headset, the second audio is acquired as the voice input content through the terminal microphone. The second audio is acquired through the terminal microphone while ensuring the first audio is played with a stereo sound effect by the Bluetooth headset, thereby avoiding the problem that the audio cannot be acquired while the stereo sound is played by using the Bluetooth headset. By applying the technical solutions in a game application program, the functions of the game application program can be achieved normally.

In the method provided in this embodiment, because there is usually a certain distance between the terminal microphone and a sound-emitting position when the second audio is acquired through the terminal, the sound intensity of the acquired second audio is usually weak. The volume of the first audio and an input sound intensity of the second audio are adjusted respectively through two different volume adjustment operations to ensure that the sound intensity of the second audio may be adjusted to an appropriate intensity.

Figure 11:
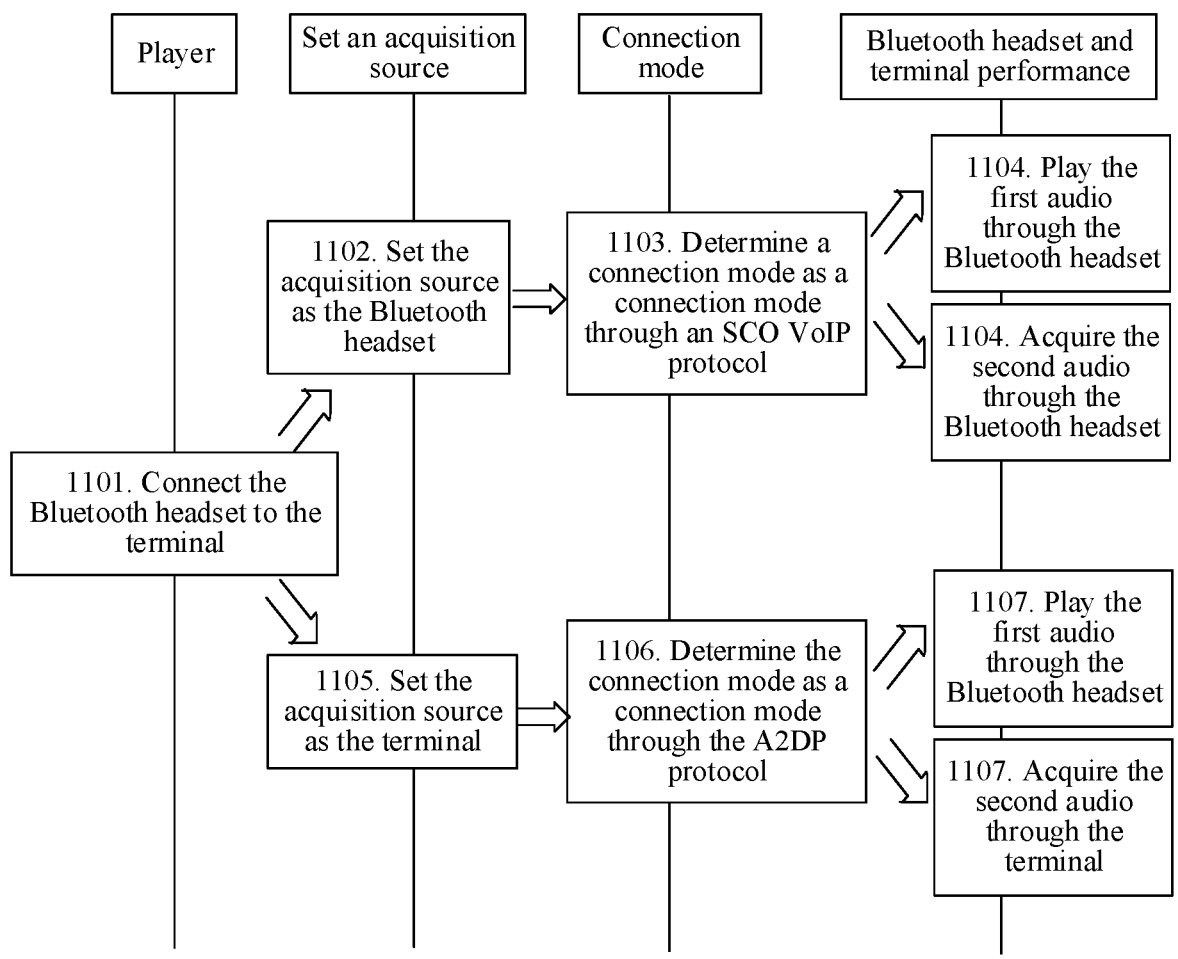
FIG. 11 is a flowchart of an audio play and acquisition method according to another exemplary embodiment of this application.

In an exemplary embodiment, referring to FIG. 11, a player, an acquisition source setting, a connection mode, and Bluetooth headset and terminal performance are combined to describe the audio play and acquisition method involved in this embodiment of this application, as shown in FIG. 11:

Step 1101. The player connects the Bluetooth headset to the terminal.

In some embodiments, the player matches the Bluetooth headset with the terminal in a terminal setting interface. After the matching succeeds, the connection between the Bluetooth headset and the terminal is implemented. Alternatively, the Bluetooth headset is a headset that has established a historical connection relationship with the terminal, and then a connection relationship between the Bluetooth headset and the terminal is automatically established when a user enables the Bluetooth headset.

Step 1102. Set the acquisition source as the Bluetooth headset.

That is, the acquisition of the second audio is set to be performed by a microphone configured in the Bluetooth headset.

Step 1103. Determine a connection mode as a connection mode through an SCO VoIP protocol.

Step 1104. Play the first audio through the Bluetooth headset, and acquire the second audio through the Bluetooth headset.

In some embodiments, the first audio is played in a form of a mono sound effect.

Step 1105. Set the acquisition source as the terminal.

That is, the acquisition of the second audio is set to be performed by a terminal microphone configured in the terminal.

Step 1106. Determine the connection mode as a connection mode through an A2DP protocol.

Step 1107. Play the first audio through the Bluetooth headset, and acquire the second audio through the terminal.

In some embodiments, the first audio is played in a form of the stereo sound effect.

In summary, by using the audio play and acquisition method provided in this embodiment, when the terminal is connected to the Bluetooth headset and plays the first audio in a form of the stereo sound effect through the Bluetooth headset, the second audio is acquired as the voice input content through the terminal microphone. The second audio is acquired through the terminal microphone while ensuring the first audio is played with a stereo sound effect by the Bluetooth headset, thereby avoiding the problem that the audio cannot be acquired while the stereo sound is played by using the Bluetooth headset. By applying the technical solutions in a game application program, the functions of the game application program can be achieved normally.

Figure 12:
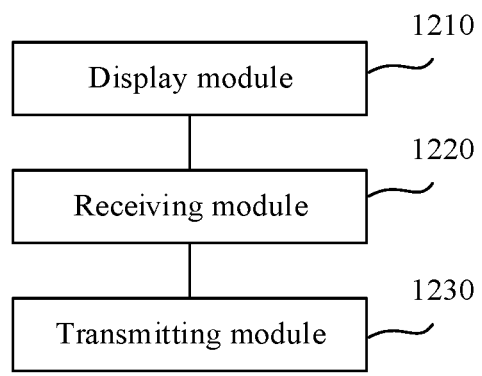
FIG. 12 is a structural block diagram of an audio play and acquisition apparatus according to an exemplary embodiment of this application.

FIG. 12 is a structural block diagram of an audio play and acquisition apparatus according to an exemplary embodiment of this application. An example in which the apparatus is the terminal 110 shown in FIG. 1 is used. The terminal is configured with a terminal microphone, and a Bluetooth headset connected to the terminal is configured with a headset microphone. The apparatus includes: a display module 1210, a receiving module 1220, and a transmitting module 1230.

The display module 1210 is configured to display a program interface of a target application program, the program interface being corresponding to first audio, and the first audio being played through the Bluetooth headset in a form of a stereo sound effect.

The receiving module 1220 is configured to receive a voice input signal, the voice input signal being used for enabling a voice input function of the terminal, and the voice input function being used for acquiring voice input content.

The transmitting module 1230 is configured to block, according to the voice input signal, a channel activating notification to be transmitted to the headset microphone, the channel activating notification being used for notifying the headset microphone to activate a first voice input channel; and notify the terminal microphone to activate a second voice input channel to acquire second audio as the voice input content.

In some embodiments, the voice input function is a function provided by the program interface, and a connection mode between the Bluetooth headset and the terminal includes any one of a stereo connection mode and a mono connection mode.

Figure 13:
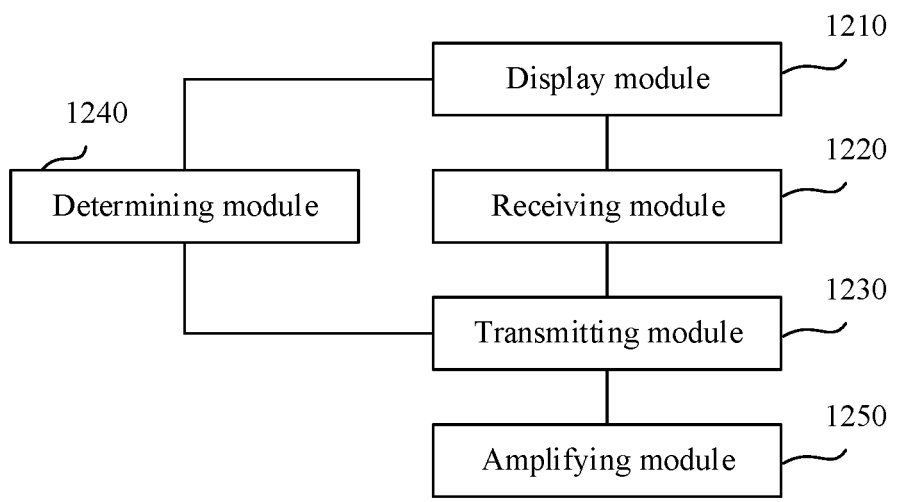
FIG. 13 is a structural block diagram of an audio play and acquisition apparatus according to another exemplary embodiment of this application.

As shown in FIG. 13, the apparatus further includes:

a determining module 1240, configured to determine the connection mode between the Bluetooth headset and the terminal; and the transmitting module 1230 is further configured to block, in response to connection between the Bluetooth headset and the terminal through the stereo connection mode, the channel activating notification to be transmitted to the headset microphone.

In some embodiments, the connection mode between the Bluetooth headset and the terminal is the stereo connection mode; and the stereo connection mode is a default connection mode between the Bluetooth headset and the terminal; or the stereo connection mode is a currently set connection mode between the Bluetooth headset and the terminal.

In some embodiments, the transmitting module 1230 is further configured to notify, in response to connection between the Bluetooth headset and the terminal through the mono connection mode, the headset microphone to activate the first voice input channel to acquire the second audio as the voice input content, the first audio being played through the Bluetooth headset in a form of a mono sound effect.

In some embodiments, the receiving module 1220 is further configured to receive a mode selection operation, the mode selection operation being used for selecting the connection mode between the Bluetooth headset and the terminal between the mono connection mode and the stereo connection mode.

An amplifying module 1250 is configured to amplify, in response to the selected connection mode corresponding to the mode selection operation being the stereo connection mode, a sound intensity of the acquired second audio by a preset multiple.

In some embodiments, the transmitting module 1230 is further configured to determine a play sound effect of the first audio played by the Bluetooth headset; and block, according to the voice input signal in response to the play sound effect of the first audio being the stereo sound effect, the channel activating notification to be transmitted to the headset microphone.

In some embodiments, the receiving module 1220 is further configured to receive a first volume adjustment operation, and adjust a play volume of the first audio according to the first volume adjustment operation.

In some embodiments, the receiving module 1220 is further configured to receive a second volume adjustment operation, and adjust, according to the second volume adjustment operation, the sound intensity of the acquired second audio.

In some embodiments, the target application program includes a game application program, the program interface includes a picture of observing a virtual environment according to a virtual object, the first audio is background audio in a game process, and the first audio is used for identifying an orientation of a sound-emitting position relative to the virtual object in the virtual environment in a case that the first audio is audio with the stereo sound effect.

The foregoing display module 1210 may be implemented by a display screen, or may be implemented by a display screen, a processor, and a memory in cooperation. The receiving module 1220, the transmitting module 1230, the determining module 1240, and the amplifying module 1250 may be implemented by a processor, or may be implemented by a processor and a memory in cooperation. As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory)

can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs image analysis and/or microscope video stream processing. In practical application, the foregoing functions may be allocated to and completed by different functional modules according to requirements, that is, an inner structure of a device is divided into different functional modules to implement all or a part of the functions described above.

Figure 14:
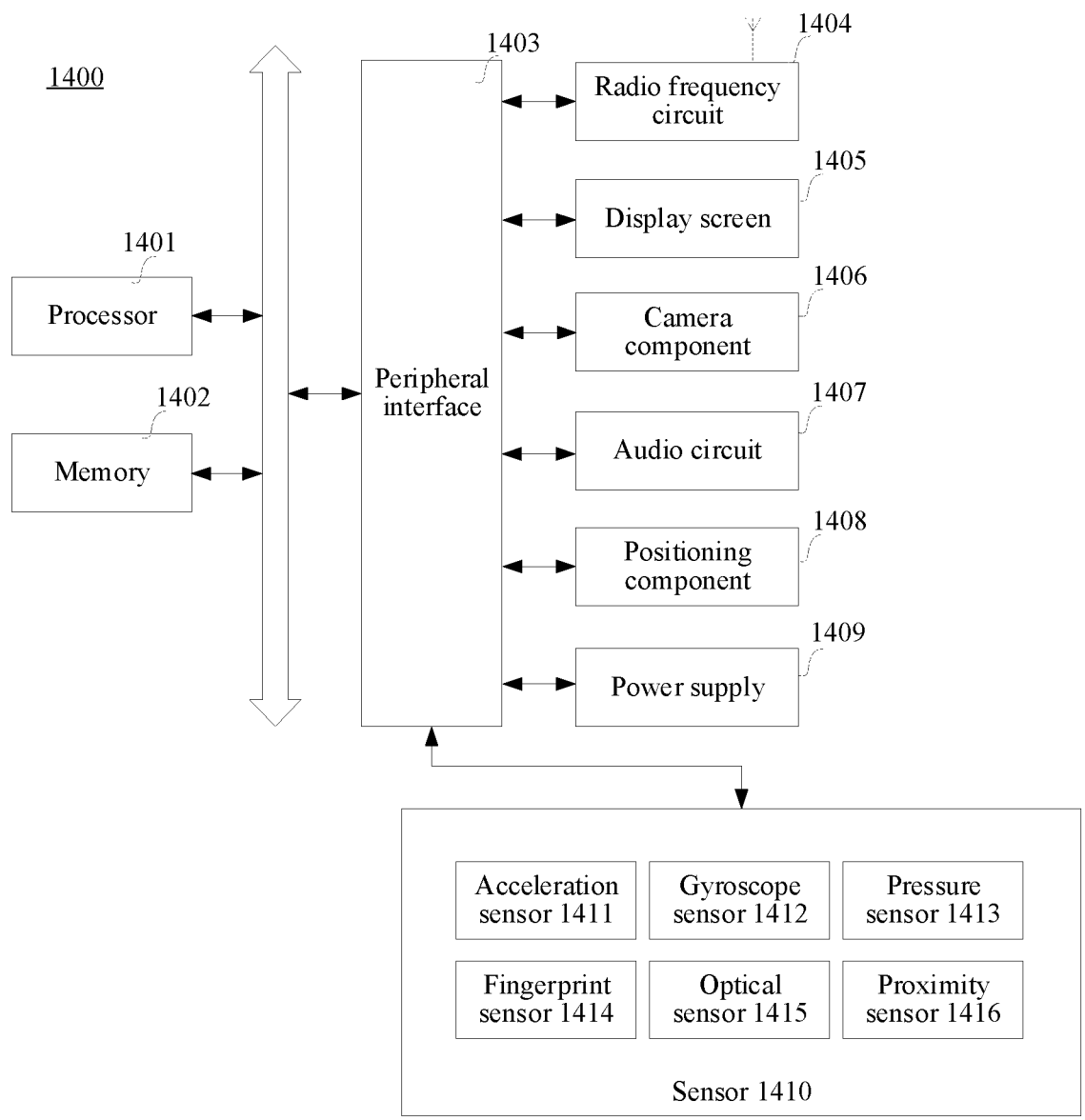
FIG. 14 is a structural block diagram of a terminal according to an exemplary embodiment of this application.

FIG. 14 is a structural block diagram of a terminal 1400 according to an exemplary embodiment of this application. The terminal 1400 may be a smartphone, a tablet computer, a Moving Picture Experts Group Audio Layer III (MP3) player, a Moving Picture Experts Group Audio Layer IV (MP4) player, a notebook computer, or a desktop computer. The terminal 1400 may also be referred to as another name such as user equipment, a portable terminal, a laptop terminal, or a desktop terminal.

Generally, the terminal 1400 includes a processor 1401 and a memory 1402.

The processor 1401 may include one or more processing cores, and may be, for example, a 4-core processor or an 8-core processor. The processor 1401 may be implemented in at least one hardware form of a digital signal processor (DSP), a field-programmable gate array (FPGA), and a programmable logic array (PLA). The processor 1401 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 1401 may be integrated with a graphics processing unit (GPU). The GPU is configured to render and draw content that needs to be displayed on a display screen. In some embodiments, the processor 1401 may further include an artificial intelligence (AI) processor. The AI processor is configured to process computing operations related to machine learning.

The memory 1402 may include one or more computer-readable storage media. The computer-readable storage medium may be non-transient. The memory 1402 may further include a high-speed random access memory and a non-volatile memory, such as one or more magnetic disk storage devices or flash storage devices. In some embodiments, the non-transitory computer-readable storage medium in the memory 1402 is configured to store at least one instruction, and the at least one instruction being configured to be executed by the processor 1401 to implement the audio play and acquisition method provided in the method embodiments of this application.

In some embodiments, the terminal 1400 may alternatively include: a peripheral interface 1403 and at least one peripheral. The processor 1401, the memory 1402, and the peripheral interface 1403 may be connected by a bus or a signal line. Each peripheral may be connected to the peripheral interface 1403 by using a bus, a signal cable, or a circuit board. Specifically, the peripheral includes at least one of a radio frequency circuit 1404, a display screen 1405, a camera component 1406, an audio circuit 1407, a positioning component 1408, and a power supply 1409.

The peripheral interface 1403 may be configured to connect the at least one peripheral related to input/output (I/O) to the processor 1401 and the memory 1402. In some embodiments, the processor 1401, the memory 1402 and the peripheral interface 1403 are integrated on a same chip or circuit board. In some other embodiments, any one or two of the processor 1401, the memory 1402, and the peripheral interface 1403 may be implemented on a single chip or circuit board. This is not limited in this embodiment.

The RF circuit 1404 is configured to receive and transmit an RF signal, which is also referred to as an electromagnetic signal. The RF circuit 1404 communicates with a communication network and other communication devices through the electromagnetic signal. The RF circuit 1404 converts an electrical signal into an electromagnetic signal for transmission, or converts a received electromagnetic signal into an electrical signal. In some embodiments, the RF circuit 1404 includes: an antenna system, an RF transceiver, one or more amplifiers, a tuner, an oscillator, a digital signal processor, a codec chip set, a subscriber identity module card, and the like. The RF circuit 1404 may communicate with other terminals by using at least one wireless communication protocol. The wireless communication protocol includes, but is not limited to a world wide web, a metropolitan area network, an intranet, generations of mobile communication networks (2G, 3G, 4G, and 5G), a wireless local area network and/or a wireless fidelity (Wi-Fi) network. In some embodiments, the RF circuit 1404 may further include a circuit related to NFC, which is not limited in this application.

The display screen 1405 is configured to display a user interface (UI). The UI may include a graph, a text, an icon, a video, and any combination thereof. When the display screen 1405 is a touch display screen, the display screen 1405 also has the capability to collect a touch signal on or above a surface of the display screen 1405. The touch signal may be inputted to the processor 1401 as a control signal for processing. In this case, the display screen 1405 may be further configured to provide a virtual button and/or a virtual keyboard, which is also referred to as a soft button and/or a soft keyboard. In some embodiments, there may be one display screen 1405 disposed on a front panel of the terminal 1400. In some other embodiments, there may be at least two display screens 1405 respectively disposed on different surfaces of the terminal 1400 or designed in a foldable shape. In still some other embodiments, the display screen 1405 may be a flexible display screen disposed on a curved surface or a folded surface of the terminal 1400. Even, the display screen 1405 may be further set in a non-rectangular irregular pattern, namely, a special-shaped screen. The display screen 1405 may be prepared by using materials such as a liquid crystal display (LCD), an organic light-emitting diode (OLED), or the like.

The camera component 1406 is configured to capture images or videos. In some embodiments, the camera component 1406 includes a front-facing camera and a rear-facing camera. Generally, the front-facing camera is disposed on the front panel of the terminal, and the rear-facing camera is disposed on a back surface of the terminal. In some embodiments, there are at least two rear cameras, which are respectively any of a main camera, a depth-of-field camera, a wide-angle camera, and a telephoto camera, to achieve background blur through fusion of the main camera and the depth-of-field camera, panoramic photographing and virtual reality (VR) photographing through fusion of the main camera and the wide-angle camera, or other fusion photographing functions. In some embodiments, the camera component 1406 may further include a flash. The flash may be a monochrome temperature flash, or may be a double color temperature flash. The double color temperature flash refers to a combination of a warm light flash and a cold light flash, and may be used for light compensation under different color temperatures.

The audio circuit 1407 may include a microphone and a speaker. The microphone is configured to collect sound waves of a user and an environment, and convert the sound waves into an electrical signal to input to the processor 1401 for processing, or input to the radio frequency circuit 1404 for implementing voice communication. For a purpose of stereo sound acquisition or noise reduction, there may be a plurality of microphones disposed at different portions of the terminal 1400 respectively. The microphone may further be an array microphone or an omni-directional acquisition type microphone. The speaker is configured to convert an electrical signal from the processor 1401 or the radio frequency circuit 1404 into acoustic waves. The speaker may be a conventional film speaker, or may be a piezoelectric ceramic speaker. When the speaker is the piezoelectric ceramic speaker, the speaker not only can convert an electric signal into acoustic waves audible to a human being, but also can convert an electric signal into acoustic waves inaudible to a human being, for ranging and other purposes. In some embodiments, the audio circuit 1407 may also include a headset jack.

The positioning component 1408 is configured to determine a current geographic location of the terminal 1400, to implement a navigation or a location based service (LBS). The positioning component 1408 may be a positioning component based on the global positioning system (GPS) of the United States, the BeiDou System of China, and the GALILEO System of Russia.

The power supply 1409 is configured to supply power to components in the terminal 1400. The power supply 1409 may be an alternating current, a direct current, a disposable battery, or a rechargeable battery. When the power supply 1409 includes a rechargeable battery, and the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a fast charging technology.

In some embodiments, the terminal 1400 may further include one or more sensors 1410. The one or more sensors 1410 include, but are not limited to: an acceleration sensor 1411, a gyroscope sensor 1412, a pressure sensor 1413, a fingerprint sensor 1414, an optical sensor 1415, and a proximity sensor 1416.

The acceleration sensor 1411 may detect a magnitude of acceleration on three coordinate axes of a coordinate system established by the terminal 1400. For example, the acceleration sensor 1411 may be configured to detect a component of gravity acceleration on the three coordinate axes. The processor 1401 may control, according to a gravity acceleration signal acquired by the acceleration sensor 1411, the display screen 1405 to display the user interface in a transverse view or a longitudinal view. The acceleration sensor 1411 may be further configured to acquire data of a game or a user movement.

The gyroscope sensor 1412 may detect a body direction and a rotation angle of the terminal 1400. The gyroscope sensor 1412 may cooperate with the acceleration sensor 1411 to acquire a 3D action by the user on the terminal 1400. The processor 1401 may implement the following functions according to the data acquired by the gyro sensor 1412: motion sensing (for example, changing the UI according to a tilt operation of the user), image stabilization during shooting, game control, and inertial navigation.

The pressure sensor 1413 may be disposed at a side frame of the terminal 1400 and/or a lower layer of the touchscreen 1405. When the pressure sensor 1413 is disposed on the side frame of the terminal 1400, a holding signal of the user on the terminal 1400 may be detected. The processor 1401 performs left and right hand recognition or a quick operation according to the holding signal acquired by the pressure sensor 1413. When the pressure sensor 1413 is disposed at the lower layer of the touch display screen 1405, the processor 1401 controls an operable control on the UI interface according to a pressure operation performed by the user on the touch display screen 1405. The operable control includes at least one of a button control, a scroll-bar control, an icon control, and a menu control.

The fingerprint sensor 1414 is configured to acquire a user's fingerprint, and the processor 1401 identifies a user's identity according to the fingerprint acquired by the fingerprint sensor 1414, or the fingerprint sensor 1414 identifies a user's identity according to the acquired fingerprint. When identifying that the user's identity is a trusted identity, the processor 1401 authorizes the user to perform related sensitive operations. The sensitive operations include: unlocking a screen, viewing encrypted information, downloading software, paying, changing a setting, and the like. The fingerprint sensor 1414 may be disposed on a front surface, a rear surface, or a side surface of the terminal 1400. When a physical button or a vendor logo is disposed on the terminal 1400, the fingerprint 1414 may be integrated with the physical button or the vendor logo.

The optical sensor 1415 is configured to acquire ambient light intensity. In an embodiment, the processor 1401 may control the display brightness of the display screen 1405 according to the ambient light intensity acquired by the optical sensor 1415. Specifically, when the ambient light intensity is relatively high, the display brightness of the display screen 1405 is increased. When the ambient light intensity is relatively low, the display brightness of the display screen 1405 is decreased. In another embodiment, the processor 1401 may further dynamically adjust a camera parameter of the camera component 1406 according to the ambient light intensity acquired by the optical sensor 1415.

The proximity sensor 1416, also referred to as a distance sensor, is usually disposed on the front panel of the terminal 1400. The proximity sensor 1416 is configured to acquire a distance between a front face of the user and the front face of the terminal 1400. In an embodiment, when the proximity sensor 1416 detects that the distance between the front face of the user and the front face of the terminal 1400 is gradually decreased, the processor 1401 controls the display screen 1405 to switch from a screen-on state to a screen-off state. When the proximity sensor 1416 detects that the distance between the front face of the user and the front face of the terminal 1400 is gradually increased, the processor 1401 controls the display screen 1405 to switch from the screen-off state to the screen-on state.

A person skilled in the art may understand that the structure shown in FIG. 14 does not constitute a limitation to the terminal 1400, and the terminal may include more or fewer components than those shown in the figure, or some components may be combined, or a different component arrangement may be used.

An embodiment of this application further provides a computer-readable storage medium, the storage medium storing at least one instruction, at least one program, a code set or an instruction set, and the at least one instruction, the at least one program, the code set or the instruction set being loaded and executed by the processor to implement the audio play and acquisition method in any one of FIG. 4, FIG. 7, and FIG. 10.

This application further provides a computer program product, the computer program product, when run on a computer, causing the computer to perform the audio play and acquisition method according to the foregoing method embodiments.

A person of ordinary skill in the art may understand that all or some of the steps of the methods in the embodiments may be implemented by a program instructing relevant hardware. The program may be stored in a computer-readable storage medium. The computer-readable storage medium may be the computer-readable storage medium included in the memory in the foregoing embodiment, or may be a computer-readable storage medium that exists independently and that is not assembled in a terminal. The computer-readable storage medium stores at least one instruction, at least one program, a code set or an instruction set, and the at least one instruction, the at least one program, the code set or the instruction set is loaded and executed by a processor to implement the audio play and acquisition method in any one of FIG. 4, FIG. 7, and FIG. 10.

In some embodiments, the computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM). The sequence numbers of the foregoing embodiments of this application are merely for description purpose but do not imply the preference among the embodiments.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely preferred embodiments of this application, and are not intended to limit this application. Any modification, equivalent replacement, improvement and the like made within the spirit and principle of this application shall fall within the protection scope of this application.

What is claimed is:

1. An audio play and acquisition method, applicable to a terminal connected to a Bluetooth headset, the terminal being configured with a terminal microphone, and the Bluetooth headset being configured with a headset microphone, the method comprising:
   displaying a program interface of a target application program, the program interface being corresponding to first audio, and the first audio being played through the Bluetooth headset in a form of a stereo sound effect;
   receiving a voice input signal, the voice input signal being used for enabling a voice input function of the terminal, and the voice input function being used for acquiring voice input content;
   determining a play sound effect of the first audio played by the Bluetooth headset;
   blocking, according to the voice input signal and in response to the play sound effect of the first audio being the stereo sound effect, a channel activating notification to be transmitted to the headset microphone, the channel activating notification being used for notifying the headset microphone to activate a first voice input channel; and
   invoking the terminal microphone to activate a second voice input channel to acquire second audio as the voice input content.

2. The method according to claim 1, wherein the voice input function is a function provided by the program interface, and a connection mode between the Bluetooth headset and the terminal comprises a stereo connection mode and a mono connection mode; and
   the blocking, according to the voice input signal, a channel activating notification to be transmitted to the headset microphone comprises:
   determining the connection mode between the Bluetooth headset and the terminal; and
   blocking, in response to the connection mode between the Bluetooth headset and the terminal being the stereo connection mode, the channel activating notification to be transmitted to the headset microphone.

3. The method according to claim 2, wherein the connection mode between the Bluetooth headset and the terminal is the stereo connection mode; and
   the stereo connection mode is a default connection mode between the Bluetooth headset and the terminal;
   or
   the stereo connection mode is a currently set connection mode between the Bluetooth headset and the terminal.

4. The method according to claim 2, further comprising:
   invoking, in response to the connection mode between the Bluetooth headset and the terminal being the mono connection mode, the headset microphone to activate the first voice input channel to acquire the second audio as the voice input content, the first audio being played through the Bluetooth headset in a form of a mono sound effect.

5. The method according to claim 2, further comprising:
   receiving a mode selection operation, the mode selection operation being used for selecting the connection mode between the Bluetooth headset and the terminal among the mono connection mode and the stereo connection mode; and
   amplifying, in response to the selected connection mode being the stereo connection mode, a sound intensity of the acquired second audio by a preset multiple.

6. The method according to claim 1, further comprising:
   receiving a first volume adjustment operation, and adjusting a play volume of the first audio according to the first volume adjustment operation.

7. The method according to claim 1, further comprising:
   receiving a second volume adjustment operation, and adjusting, according to the second volume adjustment operation, the sound intensity of the acquired second audio.

8. The method according to claim 1, wherein the target application program comprises a game application program, the program interface comprises a picture of observing a virtual environment according to a virtual object, the first audio is background audio in a game process, and the first audio is used for identifying an orientation of a sound-emitting position relative to the virtual object in the virtual environment in a case that the first audio is audio with the stereo sound effect.

9. A terminal connected to a Bluetooth headset, the terminal comprising a processor, a terminal microphone and a memory, the memory storing a plurality of instructions that, when executed by the processor, cause the terminal to perform a plurality of operations including:
- displaying a program interface of a target application program, the program interface being corresponding to first audio, and the first audio being played through the Bluetooth headset in a form of a stereo sound effect;
- receiving a voice input signal, the voice input signal being used for enabling a voice input function of the terminal, and the voice input function being used for acquiring voice input content;
- determining a play sound effect of the first audio played by the Bluetooth headset;
- blocking, according to the voice input signal and in response to the play sound effect of the first audio being the stereo sound effect, a channel activating notification to be transmitted to the headset microphone, the channel activating notification being used for notifying the headset microphone to activate a first voice input channel; and
- invoking the terminal microphone to activate a second voice input channel to acquire second audio as the voice input content.

10. The terminal according to claim 9, wherein the voice input function is a function provided by the program interface, and a connection mode between the Bluetooth headset and the terminal comprises a stereo connection mode and a mono connection mode; and
- the blocking, according to the voice input signal, a channel activating notification to be transmitted to the headset microphone comprises:
- determining the connection mode between the Bluetooth headset and the terminal; and
- blocking, in response to the connection mode between the Bluetooth headset and the terminal being the stereo connection mode, the channel activating notification to be transmitted to the headset microphone.

11. The terminal according to claim 10, wherein the connection mode between the Bluetooth headset and the terminal is the stereo connection mode; and
- the stereo connection mode is a default connection mode between the Bluetooth headset and the terminal;
- or
- the stereo connection mode is a currently set connection mode between the Bluetooth headset and the terminal.

12. The terminal according to claim 10, wherein the plurality of operations further comprise:
- invoking, in response to the connection mode between the Bluetooth headset and the terminal being the mono connection mode, the headset microphone to activate the first voice input channel to acquire the second audio as the voice input content, the first audio being played through the Bluetooth headset in a form of a mono sound effect.

13. The terminal according to claim 10, wherein the plurality of operations further comprise:
- receiving a mode selection operation, the mode selection operation being used for selecting the connection mode between the Bluetooth headset and the terminal among the mono connection mode and the stereo connection mode; and
- amplifying, in response to the selected connection mode being the stereo connection mode, a sound intensity of the acquired second audio by a preset multiple.

14. The terminal according to claim 9, wherein the plurality of operations further comprise:
- receiving a first volume adjustment operation, and adjusting a play volume of the first audio according to the first volume adjustment operation.

15. The terminal according to claim 9, wherein the plurality of operations further comprise:
- receiving a second volume adjustment operation, and adjusting, according to the second volume adjustment operation, the sound intensity of the acquired second audio.

16. The terminal according to claim 9, wherein the target application program comprises a game application program, the program interface comprises a picture of observing a virtual environment according to a virtual object, the first audio is background audio in a game process, and the first audio is used for identifying an orientation of a sound-emitting position relative to the virtual object in the virtual environment in a case that the first audio is audio with the stereo sound effect.

17. A non-transitory computer-readable storage medium, the storage medium storing plurality of instructions that, when executed by a processor of a terminal connected to a Bluetooth headset and having a terminal microphone, cause the terminal to perform a plurality of operations including:
- displaying a program interface of a target application program, the program interface being corresponding to first audio, and the first audio being played through the Bluetooth headset in a form of a stereo sound effect;
- receiving a voice input signal, the voice input signal being used for enabling a voice input function of the terminal, and the voice input function being used for acquiring voice input content;
- determining a play sound effect of the first audio played by the Bluetooth headset;
- blocking, according to the voice input signal and in response to the play sound effect of the first audio being the stereo sound effect, a channel activating notification to be transmitted to the headset microphone, the channel activating notification being used for notifying the headset microphone to activate a first voice input channel; and
- invoking the terminal microphone to activate a second voice input channel to acquire second audio as the voice input content.

18. The non-transitory computer-readable storage medium according to claim 17, wherein the plurality of operations further comprise:
- receiving a first volume adjustment operation, and adjusting a play volume of the first audio according to the first volume adjustment operation.

19. The non-transitory computer-readable storage medium according to claim 17, wherein the plurality of operations further comprise:
- receiving a second volume adjustment operation, and adjusting, according to the second volume adjustment operation, the sound intensity of the acquired second audio.

20. The non-transitory computer-readable storage medium according to claim 17, wherein the target application program comprises a game application program, the program interface comprises a picture of observing a virtual environment according to a virtual object, the first audio is background audio in a game process, and the first audio is used for identifying an orientation of a sound-emitting position relative to the virtual object in the virtual environment in a case that the first audio is audio with the stereo sound effect.

\* \* \* \* \*